United States Patent
Nagayoshi

(10) Patent No.: US 10,369,845 B2
(45) Date of Patent: Aug. 6, 2019

(54) PNEUMATIC TIRE

(71) Applicant: The Yokohama Rubber Co., Ltd., Minato-ku, Tokyo (JP)

(72) Inventor: Masatoshi Nagayoshi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 258 days.

(21) Appl. No.: 14/434,357

(22) PCT Filed: Oct. 10, 2012

(86) PCT No.: PCT/JP2012/076251
§ 371 (c)(1),
(2) Date: Apr. 8, 2015

(87) PCT Pub. No.: WO2014/057553
PCT Pub. Date: Apr. 17, 2014

(65) Prior Publication Data
US 2015/0258856 A1    Sep. 17, 2015

(51) Int. Cl.
*B60C 9/20* (2006.01)
*B60C 9/18* (2006.01)
(Continued)

(52) U.S. Cl.
CPC ............. *B60C 9/20* (2013.01); *B60C 3/04* (2013.01); *B60C 9/185* (2013.01); *B60C 9/2006* (2013.01);
(Continued)

(58) Field of Classification Search
CPC .... B60C 9/18; B60C 3/04; B60C 9/02; B60C 11/04; B60C 11/00; B60C 1/00; B60C 11/117; B60C 3/00; B32B 15/00
(Continued)

(56) References Cited

U.S. PATENT DOCUMENTS 3,939,890 A * 2/1976 Abe .................. B60C 11/00
 152/209.13
5,343,917 A * 9/1994 Okihara ............. B60C 9/2006
 152/209.18
(Continued)

FOREIGN PATENT DOCUMENTS

JP    H04-66304    3/1992
JP    2003-211914  7/2003
(Continued)

OTHER PUBLICATIONS

Masuyama, Pneumatic tire, Apr. 18, 2012, JP4918948, Translated in English by Google.*
(Continued)

*Primary Examiner* — Matthew J Daniels
*Assistant Examiner* — Yunju Kim
(74) *Attorney, Agent, or Firm* — Thorpe North & Western

(57) ABSTRACT

A pneumatic tire is provided with a carcass layer, a belt layer disposed on the outer side of the carcass layer in a radial direction of the tire, and tread rubber disposed on the outer side of the belt layer in the radial direction of the tire. The belt layer is formed by layering a pair of cross belts having belt angles with absolute values from 10° to 45° inclusive and opposite signs, and a circumferential reinforcing layer having a belt angle within a range of ±5° with respect to the circumferential direction of the tire. A distance (Gcc) from a tread profile to an inner circumferential surface of the tire along a tire equatorial plane and a distance (Gsh) from a tread end (p) to the inner circumferential surface of the tire have a relationship such that 1.10≤Gsh/Gcc.

20 Claims, 13 Drawing Sheets

(51) Int. Cl.
  *B60C 11/00* (2006.01)
  *B60C 9/28* (2006.01)
  *B60C 3/04* (2006.01)
  *B60C 11/04* (2006.01)
  *B60C 11/01* (2006.01)
  *B60C 9/22* (2006.01)
  *B60C 11/03* (2006.01)

(52) U.S. Cl.
  CPC ............ *B60C 9/28* (2013.01); *B60C 11/0008* (2013.01); *B60C 11/01* (2013.01); *B60C 11/04* (2013.01); *B60C 2009/209* (2013.01); *B60C 2009/2064* (2013.01); *B60C 2009/2083* (2013.01); *B60C 2009/2242* (2013.01); *B60C 2009/2261* (2013.01); *B60C 2009/2266* (2013.01); *B60C 2011/0016* (2013.01); *B60C 2011/0025* (2013.01); *B60C 2011/0033* (2013.01); *B60C 2011/0355* (2013.01); *B60C 2200/06* (2013.01)

(58) Field of Classification Search
  USPC ....... 152/209, 454, 527, 531, 532, 537, 538, 152/548; 428/375, 377, 379
  See application file for complete search history.

(56) References Cited

U.S. PATENT DOCUMENTS

| | | | |
|---|---|---|---|
| 6,401,778 B1 | 6/2002 | Cluzel | |
| 6,703,126 B1 * | 3/2004 | Miyazaki | B60C 9/0007 428/375 |
| 2004/0069392 A1 * | 4/2004 | Maruoka | B60C 3/04 152/454 |
| 2005/0016656 A1 | 1/2005 | Kuroki et al. | |
| 2005/0039834 A1 * | 2/2005 | Suzuki | B60C 11/00 152/209.5 |
| 2006/0169380 A1 | 8/2006 | Radulescu et al. | |
| 2006/0169381 A1 | 8/2006 | Radulescu et al. | |
| 2006/0169383 A1 | 8/2006 | Radulescu et al. | |
| 2009/0229722 A1 * | 9/2009 | Isobe | B60C 9/2006 152/209.18 |
| 2009/0277557 A1 | 11/2009 | Suzuki et al. | |
| 2014/0326380 A1 | 11/2014 | Kotoku | |

FOREIGN PATENT DOCUMENTS

| | | |
|---|---|---|
| JP | 2006-528103 | 12/2006 |
| JP | 2008-001264 | 1/2008 |
| JP | 2009-018629 | 1/2009 |
| JP | 4354114 | 10/2009 |
| JP | 4642760 | 3/2011 |
| JP | 4663638 | 4/2011 |
| JP | 4663639 | 4/2011 |
| JP | 4918948 | 4/2012 |
| JP | 4984013 | 7/2012 |
| WO | WO 99/24269 | 5/1999 |
| WO | WO 03/053722 | 7/2003 |
| WO | WO 2005/016666 | 2/2005 |
| WO | WO 2005/016667 | 2/2005 |
| WO | WO 2005/016668 | 2/2005 |
| WO | WO 2007/148447 | 12/2007 |
| WO | WO 2013/042255 | 3/2013 |
| WO | WO 2013/042256 | 3/2013 |

OTHER PUBLICATIONS

International Search Report for International Application No. PCT/JP2012/076251 dated Jan. 15, 2013, 4 pages, Japan.

* cited by examiner

COMPARATIVE EXAMPLE
(Gsh/Gcc=1.06)

WORKING EXAMPLES
(Gsh/Gcc=1.20)

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 |
|---|---|---|---|---|---|---|---|---|
| CIRCUMFERENTIAL REINFORCING LAYER | YES | YES | YES | YES | YES | YES | YES | YES |
| Gsh/Gcc | 1.06 | 1.10 | 1.20 | 1.25 | 1.25 | 1.25 | 1.25 | 1.25 |
| Gs/Ge | 0.90 | 1.00 | 1.00 | 1.00 | 1.00 | 1.00 | 1.00 | 1.00 |
| Ws/TW | 0.65 | 0.65 | 0.65 | 0.65 | 0.70 | 0.80 | 0.90 | 0.80 |
| Tc/Dc | 1.00 | 1.00 | 1.00 | 1.00 | 1.00 | 1.00 | 1.00 | 1.00 |
| Te/De | 1.15 | 1.15 | 1.15 | 1.15 | 1.15 | 1.15 | 1.15 | 1.15 |
| Wb2/Wca | 0.70 | 0.70 | 0.70 | 0.70 | 0.70 | 0.70 | 0.70 | 0.70 |
| NO. OF ENDS OF CROSS BELTS (ENDS/50 mm) | 15 | 15 | 15 | 15 | 15 | 15 | 15 | 15 |
| BELT ANGLE OF HIGH ANGLE BELT (°) | 40 | 40 | 40 | 40 | 40 | 40 | 40 | 40 |
| NO. OF ENDS OF HIGH ANGLE BELT (ENDS/50 mm) | 13 | 13 | 13 | 13 | 13 | 13 | 13 | 13 |
| Wb1/Wb3 | 0.8 | 0.8 | 0.8 | 0.8 | 0.8 | 0.8 | 0.8 | 0.8 |
| DURABILITY | 100 | 102 | 103 | 105 | 107 | 109 | 108 | 108 |
| RIDE COMFORT PERFORMANCE | 100 | 101 | 101 | 102 | 102 | 102 | 102 | 103 |

FIG. 10A

| | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 |
|---|---|---|---|---|---|---|---|---|---|
| CIRCUMFERENTIAL REINFORCING LAYER | YES | YES | YES | YES | YES | YES | YES | YES | YES |
| Gsh/Gcc | 1.25 | 1.25 | 1.10 | 1.20 | 1.25 | 1.25 | 1.25 | 1.20 | 1.10 |
| Gs/Ge | 1.20 | 1.30 | 1.00 | 1.10 | 1.20 | 1.20 | 1.20 | 1.10 | 1.00 |
| Ws/TW | 0.80 | 0.80 | 0.80 | 0.80 | 0.80 | 0.80 | 0.80 | 0.80 | 0.80 |
| Tc/Dc | 1.00 | 1.00 | 1.30 | 1.30 | 1.30 | 1.45 | 1.55 | 1.55 | 1.55 |
| Te/De | 1.15 | 1.15 | 1.35 | 1.35 | 1.35 | 1.50 | 1.60 | 1.60 | 1.60 |
| Wb2/Wca | 0.70 | 0.70 | 0.70 | 0.70 | 0.70 | 0.70 | 0.70 | 0.70 | 0.70 |
| NO. OF ENDS OF CROSS BELTS (ENDS/50 mm) | 15 | 15 | 15 | 15 | 15 | 15 | 15 | 15 | 15 |
| BELT ANGLE OF HIGH ANGLE BELT (°) | 40 | 40 | 40 | 40 | 40 | 40 | 40 | 40 | 40 |
| NO. OF ENDS OF HIGH ANGLE BELT (ENDS/50 mm) | 13 | 13 | 40 | 13 | 13 | 13 | 13 | 13 | 13 |
| Wb1/Wb3 | 0.8 | 0.8 | 0.8 | 0.8 | 0.8 | 0.8 | 0.8 | 0.8 | 0.8 |
| DURABILITY | 108 | 107 | 107 | 109 | 110 | 111 | 110 | 109 | 107 |
| RIDE COMFORT PERFORMANCE | 104 | 104 | 109 | 110 | 111 | 112 | 111 | 110 | 109 |

FIG. 10B

| | WORKING EXAMPLE 17 | WORKING EXAMPLE 18 | WORKING EXAMPLE 19 | WORKING EXAMPLE 20 | WORKING EXAMPLE 21 | WORKING EXAMPLE 22 | WORKING EXAMPLE 23 | WORKING EXAMPLE 24 |
|---|---|---|---|---|---|---|---|---|
| CIRCUMFERENTIAL REINFORCING LAYER | YES | YES | YES | YES | YES | YES | YES | YES |
| Gsh/Gcc | 1.25 | 1.25 | 1.25 | 1.25 | 1.25 | 1.25 | 1.25 | 1.25 |
| Gs/Ge | 1.20 | 1.20 | 1.20 | 1.20 | 1.20 | 1.20 | 1.20 | 1.20 |
| Ws/TW | 0.80 | 0.80 | 0.80 | 0.80 | 0.80 | 0.80 | 0.80 | 0.80 |
| Tc/Dc | 1.45 | 1.45 | 1.45 | 1.45 | 1.45 | 1.45 | 1.45 | 1.45 |
| Te/De | 1.50 | 1.50 | 1.50 | 1.50 | 1.50 | 1.50 | 1.50 | 1.50 |
| Wb2/Wca | 0.74 | 0.80 | 0.89 | 0.80 | 0.80 | 0.80 | 0.80 | 0.80 |
| NO. OF ENDS OF CROSS BELTS (ENDS/50 mm) | 15 | 15 | 15 | 18 | 23 | 28 | 23 | 23 |
| BELT ANGLE OF HIGH ANGLE BELT (°) | 40 | 40 | 40 | 40 | 40 | 40 | 45 | 60 |
| NO. OF ENDS OF HIGH ANGLE BELT (ENDS/50 mm) | 13 | 13 | 13 | 13 | 13 | 13 | 13 | 13 |
| Wb1/Wb3 | 0.8 | 0.8 | 0.8 | 0.8 | 0.8 | 0.8 | 0.8 | 0.8 |
| DURABILITY | 110 | 111 | 110 | 112 | 114 | 112 | 117 | 116 |
| RIDE COMFORT PERFORMANCE | 109 | 110 | 109 | 114 | 113 | 112 | 115 | 116 |

FIG. 11A

| | WORKING EXAMPLE 25 | WORKING EXAMPLE 26 | WORKING EXAMPLE 27 | WORKING EXAMPLE 28 | WORKING EXAMPLE 29 | WORKING EXAMPLE 30 | WORKING EXAMPLE 31 |
|---|---|---|---|---|---|---|---|
| CIRCUMFERENTIAL REINFORCING LAYER | YES | YES | YES | YES | YES | YES | YES |
| Gsh/Gcc | 1.25 | 1.25 | 1.25 | 1.25 | 1.25 | 1.25 | 1.25 |
| Gs/Ge | 1.20 | 1.20 | 1.20 | 1.20 | 1.20 | 1.20 | 1.20 |
| Ws/TW | 0.80 | 0.80 | 0.80 | 0.80 | 0.80 | 0.80 | 0.80 |
| Tc/Dc | 1.45 | 1.45 | 1.45 | 1.45 | 1.45 | 1.45 | 1.45 |
| Te/De | 1.50 | 1.50 | 1.50 | 1.50 | 1.50 | 1.50 | 1.50 |
| Wb2/Wca | 0.80 | 0.80 | 0.80 | 0.80 | 0.80 | 0.80 | 0.80 |
| NO. OF ENDS OF CROSS BELTS (ENDS/50 mm) | 23 | 23 | 23 | 23 | 23 | 23 | 23 |
| BELT ANGLE OF HIGH ANGLE BELT (°) | 70 | 60 | 60 | 60 | 60 | 60 | 60 |
| NO. OF ENDS OF HIGH ANGLE BELT (ENDS/50 mm) | 13 | 15 | 20 | 25 | 20 | 20 | 20 |
| Wb1/Wb3 | 0.8 | 0.8 | 0.8 | 0.8 | 0.85 | 0.95 | 1.05 |
| DURABILITY | 115 | 118 | 120 | 118 | 121 | 122 | 121 |
| RIDE COMFORT PERFORMANCE | 117 | 120 | 119 | 118 | 120 | 121 | 120 |

FIG. 11B

PNEUMATIC TIRE

TECHNICAL FIELD

The present technology relates to a pneumatic tire, and, more specifically, to a pneumatic tire allowing for improved ride comfort performance.

BACKGROUND

Recent heavy duty tires mounted on trucks and buses and the like maintain their tread shape due to the tires having a low aspect ratio while having a circumferential reinforcing layer disposed in the belt layer. The circumferential reinforcing layer is a belt ply having a belt angle that is substantially 0° with respect to the circumferential direction of the tire, and is disposed so as to be stacked upon a pair of cross belts. The technologies disclosed in Japanese Patent Nos. 4642760, 4663638 and 4663639 are conventional pneumatic tires that are configured in this manner.

SUMMARY

The present technology provides a pneumatic tire that allows for improved ride comfort performance.

A pneumatic tire according to the present technology is a pneumatic tire provided with a carcass layer, a belt layer disposed outside the carcass layer in a radial direction of the tire, and tread rubber disposed out the belt layer in a radial direction of the tire, as well as at least three circumferential main grooves extending in a circumferential direction of the tire and a plurality of land portions delineated by the circumferential main grooves, the tire being characterized in that the belt layer is formed by layering a pair of cross belts having a belt angle with an absolute value of 10° to 45° inclusive and having differently signed belt angles and a circumferential reinforcing layer having a belt angle within a range of ±5° with respect to the circumferential direction of the tire, a distance Gcc from a tread profile at an tire equatorial plane to an inner circumferential surface of the tire and a distance Gsh from a tread end to the inner circumferential surface of the tire have a relationship such that 1.10≤Gsh/Gcc, and, defining an intersection between a vertical line drawn from the tread end to the inner circumferential surface of the tire and the wider of the pair of cross belts as point Q1 and a base of a vertical line drawn from an outer end of the circumferential reinforcing layer with respect to a widthwise direction of the tire to the wider cross belt as point Q2, a distance Gs from point Q1 to the tread profile and a distance Ge from point Q2 to the tread profile have a relationship such that 1.00≤Gs/Ge.

Because the ratio Gsh/Gcc of the pneumatic tire according to the present technology, is set to a high value, the tread face as a whole has a flat (i.e., substantially parallel to the tire rotational axis) shape, and the volume of tread rubber 15 (distance Gsh) at a shoulder portion is ensured (see FIGS. 1 and 2). In addition, because the ratio Gs/Ge is set to a high value, an appropriate volume (distance Gs) is ensured for the tread rubber at the shoulder portion. As a result, the deformation level of the shoulder portion when the tire is in contact with the ground is reduced, and suitable rigidity is ensured for the shoulder land portions. This ensures suitable envelopment and offers the advantage of improved tire ride comfort performance.

BRIEF DESCRIPTION OF THE DRAWINGS

FIGS. 10A-10B include a table showing results of performance testing of pneumatic tires according to embodiments of the present technology.

FIGS. 11A-11B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
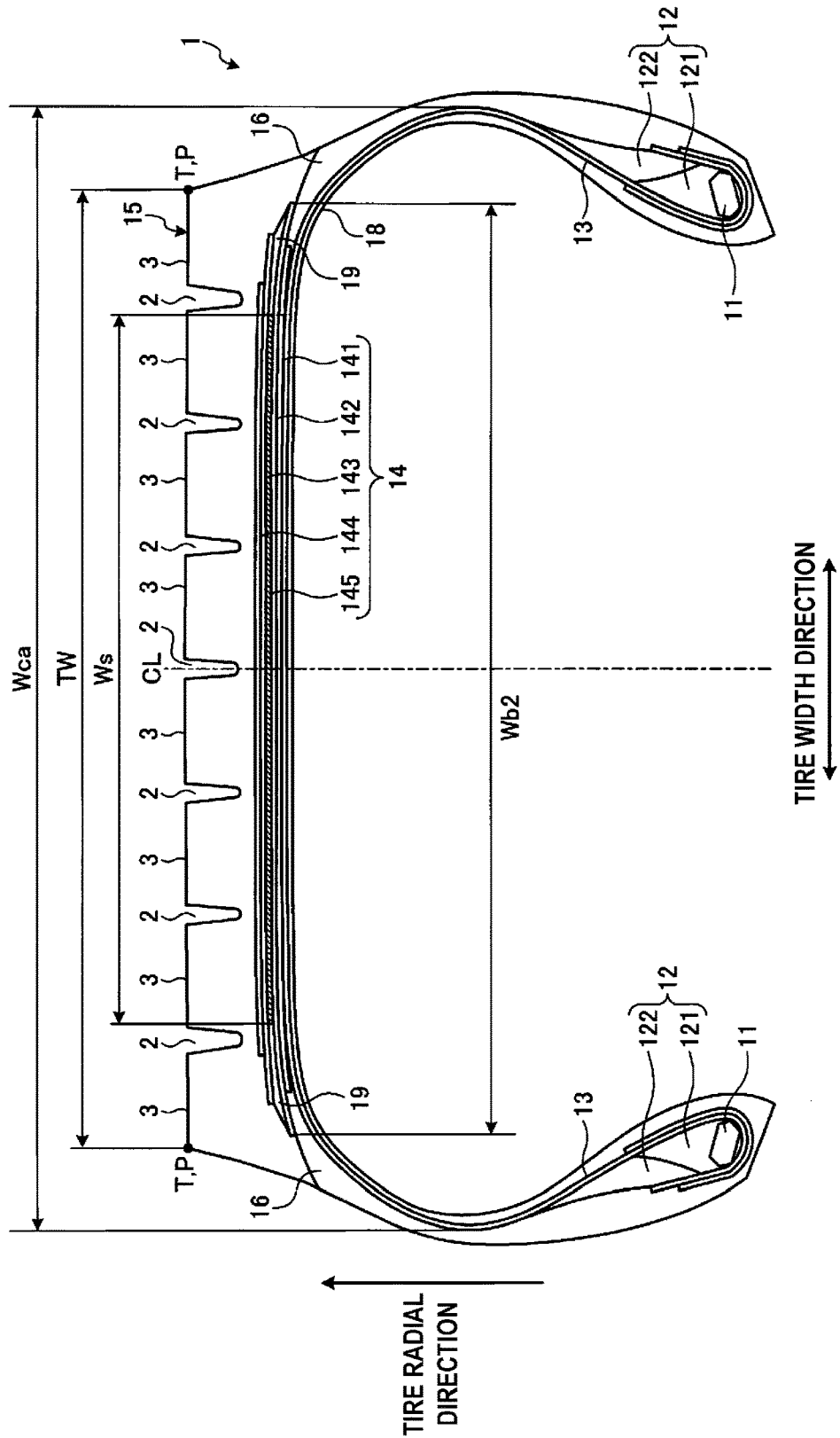
FIG. 1 is a cross-sectional view in a tire meridian direction illustrating a pneumatic tire according to an embodiment of the present technology.

FIG. 1 is a cross-sectional view in a tire longitudinal direction illustrating a pneumatic tire 1 according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the radial direction of the tire so as to reinforce the bead portions.

The carcass layer 13 stretches between the left and right side bead cores 11 and 11 in toroidal form, forming a framework for the tire. Additionally, both end portions of the carcass layer 13 are folded from an inner side in a widthwise direction of the tire toward an outer side in the widthwise direction of the tire and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the circumferential direction of the tire) with an absolute value from 85° to 95° inclusive.

The belt layer 14 is formed by layering a plurality of belt plies 141 to 145, and disposed to extend over a periphery of the carcass layer 13. A detailed arrangement of the belt layer 14 is described below.

The tread rubber 15 is disposed on an outer circumference in the radial direction of the tire of the carcass layer 13 and the belt layer 14, and forms a tread portion of the tire. The pair of side wall rubbers 16, 16 is disposed on each outer side of the carcass layer 13 in the widthwise direction of the tire, so as to form left and right sidewall portions of the tire.

In the arrangement illustrated in FIG. 1, the pneumatic tire 1 includes seven circumferential main grooves 2 that extend in a circumferential direction of the tire, and eight land portions 3 partitioned and formed by the circumferential main grooves 2. The land portions 3 are formed of blocks that are segmented in the circumferential direction by ribs or lug grooves (not illustrated on the drawings) that continue in the circumferential direction of the tire.

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in the pneumatic tire 1, the left and right outermost circumferential main grooves 2, 2 in the widthwise direction of the tire are referred to as outermost circumferential main grooves. Moreover, the left and right land portions 3, 3 on the outer side in the widthwise direction of the tire that are defined by the left and right outermost circumferential main grooves 2, 2 are referred to as shoulder land portions.

[Belt Layer]

Figure 2:
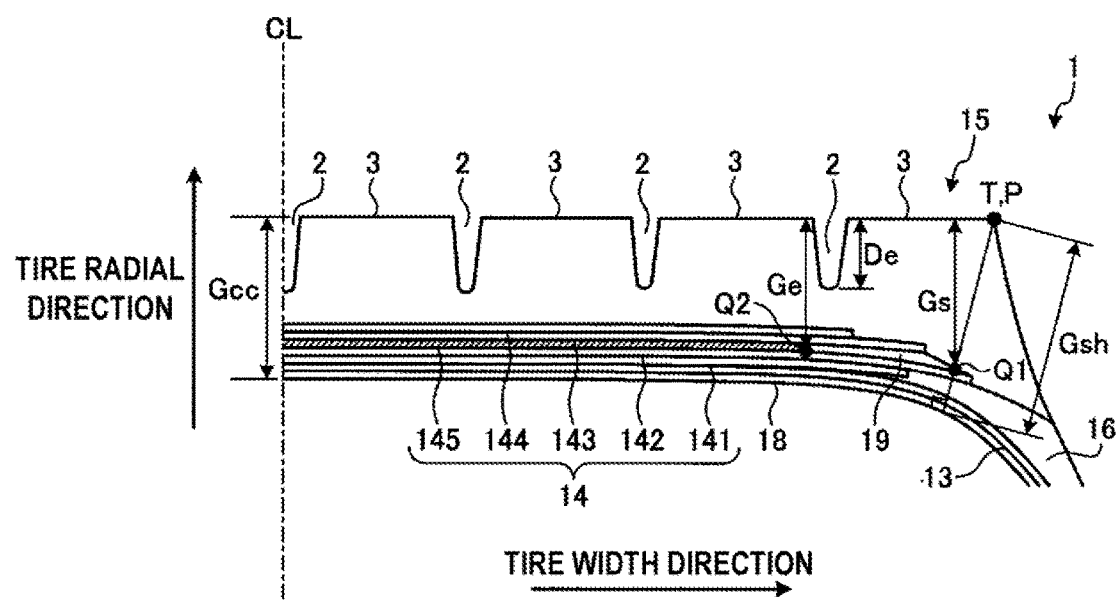
FIG. 2 is an explanatory illustration showing a belt layer of the pneumatic tire depicted in FIG. 1.
Figure 3:
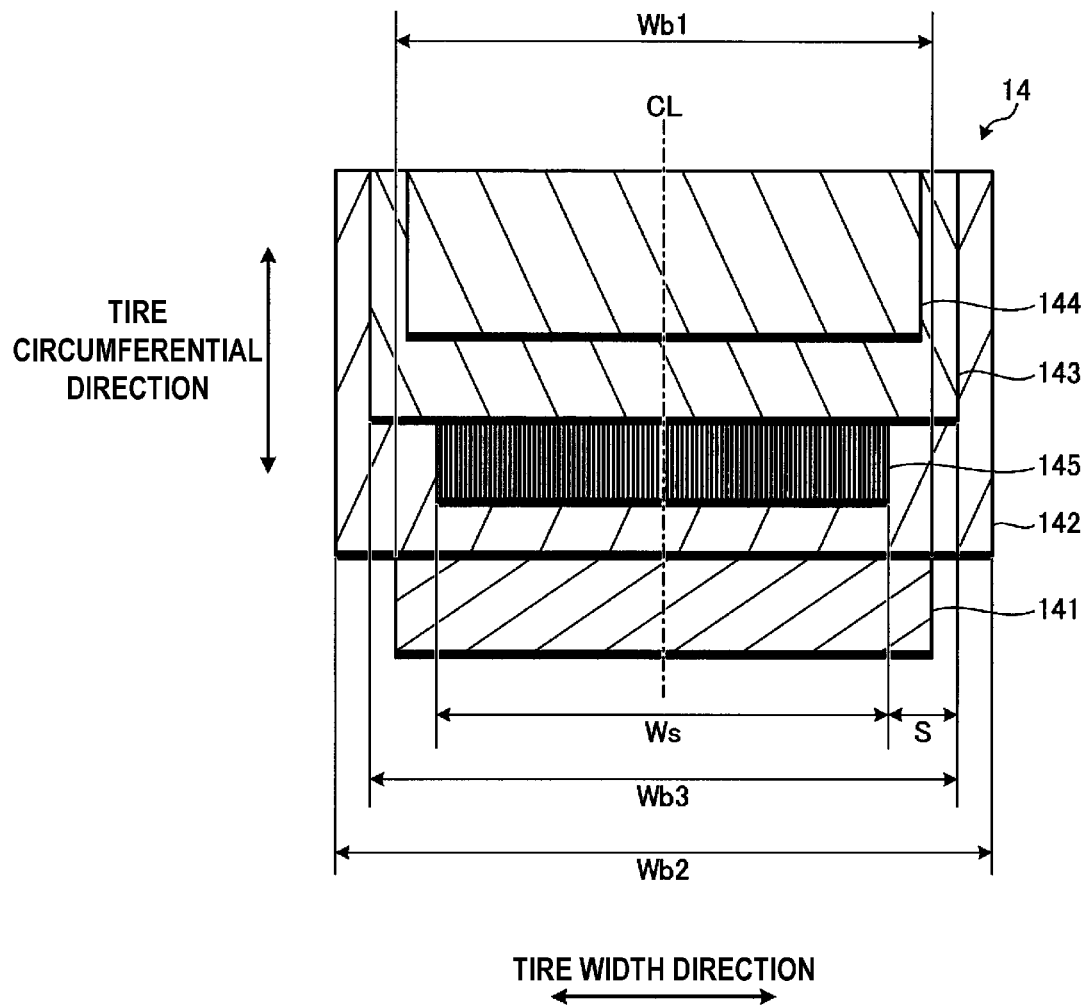
FIG. 3 is an explanatory illustration showing a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a layered structure of the belt layer 14. Furthermore, the thin lines in the belt plies 141 to 145 in FIG. 3 schematically represent the respective belt cords of the belt plies 141 to 145.

The belt layer 14 is formed by layering a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is configured by a plurality of belt cords formed from steel or organic fibers, covered by coating rubber, and subjected to a rolling process, having a belt angle (angle of inclination of the fiber direction of the belt cords with respect to the circumferential direction of the tire) with an absolute value from 45° to 70° inclusive. Moreover, the large angle belt 141 is disposed so as to be layered on the outer side of the carcass layer 13 with respect to the radial direction of the tire.

The pair of cross belts 142, 143 are configured by a plurality of belt cords formed from steel or organic fibers, covered by coating rubber, and subjected to a rolling process, having a belt angle with an absolute value from 10° to 45° inclusive. Additionally, the pair of cross belts 142, 143 have belt angles that are of mutually opposite signs, and are layered such that the fiber directions of the belt cords intersect each other (a crossply structure). In the following description, the cross belt 142 positioned on the inner side in the radial direction of the tire is referred to as "inner-side cross belt", and the cross belt 143 positioned on the outer side in the radial direction of the tire is referred to as "outer-side cross belt". Three or more cross belts may be disposed so as to be layered (not illustrated on the drawings). The pair of cross belts 142, 143 are disposed on the outer side of the large angle belt 141 with respect to the radial direction of the tire.

Also, the belt cover 144 is configured by a plurality of belt cords formed from steel or organic fibers, covered by coating rubber, and subjected to a rolling process, having a belt angle with an absolute value from 10° to 45° inclusive. Moreover, the belt cover 144 is disposed so as to be layered on the outer side in the radial direction of the tire of the cross belts 142, 143. In this embodiment, the belt cover 144 has the same belt angle as the outer-side cross belt 143, and is disposed in the outermost layer of the belt layer 14.

The circumferential reinforcing layer 145 is configured by belt cords formed from steel, and covered by coating rubber that are wound in a spiral manner with an inclination within a range of ±5° with respect to the circumferential direction of the tire. The circumferential reinforcing layer 145 is disposed so as to be interposed between the pair of cross belts 142, 143. Additionally, the circumferential reinforcing layer 145 is disposed to the inside of the left and right edges of the pair of cross belts 142, 143 with respect to the widthwise direction of the tire. Specifically, the circumferential reinforcing layer 145 is formed by winding one or a plurality of wires in a spiral manner around the periphery of the inner-side cross belt 142. This circumferential reinforcing layer 145 reinforces the stiffness in the circumferential direction of the tire. As a result, the tire durability is improved.

In the pneumatic tire 1, the belt layer 14 may have an edge cover (not illustrated on the drawings). Generally, the edge cover is configured by a plurality of belt cords formed from steel or organic fibers covered by coating rubber and subjected to a rolling process, having a belt angle with an absolute value from 0° to 5° inclusive. Additionally, edge covers are disposed on the outer side in the radial direction of the tire of the left and right edges of the outer-side cross belt 143 (or the inner-side cross belt 142). The edge covers exhibit a hoop effect, thereby mitigating the difference in radial growth between the center area and the shoulder areas of the tread portion, and improving the performance of the tire in resisting uneven wear.

[Ride Comfort Performance-Improving Structure]

Recent heavy duty tires mounted on trucks, buses, and the like maintain their tread shape due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the tread shape is maintained.

In this arrangement, the circumferential reinforcing layer increases the rigidity of the tread portion in the circumferential direction of the tire, leading to the problem of reduced ride comfort performance.

Thus, in order to improve ride comfort performance, the pneumatic tire features the arrangement described hereafter (see FIGS. 1-3).

As illustrated in FIG. 2, in the pneumatic tire 1, a distance Gcc from the tread profile to the inner circumferential surface of the tire along the tire equatorial plane CL and a distance Gsh from the tread edge P to the inner circumferential surface of the tire have a relationship such that $1.10 \leq Gsh/Gcc$. In particular, as shown by the results of a performance test to be described later (see FIGS. 10A-10B), this ratio Gsh/Gcc is preferably such that 1.20≤Gsh/Gcc. This effectively improves the belt-edge-separation resistance performance of the tire.

On the other hand, the upper limit of the ratio Gsh/Gcc is not particularly limited, but when the tire is assembled on a regular rim, filled with regular internal pressure, and in an unloaded state, the radius along the tread edge P of the tread profile is preferably less than or equal to the radius along the tire equatorial plane CL. That is, the tread profile has a linear shape or an arc shape having a center on the inner side in the radial direction of the tire, and is configured so as not to have a reverse R shape (arc shape having a center on the outer side in the radial direction of the tire). For example, in an arrangement having a square shoulder portion as in FIG. 2, the upper limit of the ratio Gsh/Gcc is approximately from 1.4 to 1.5. On the other hand, in an arrangement having a round shoulder portion as in FIG. 8, the upper limit of the ratio Gsh/Gcc is approximately from 1.3 to 1.4.

The distance Gcc is measured as the distance from the intersection of the tire equatorial plane CL and the tread profile to the intersection of the tire equatorial plane CL and the inner circumferential surface of the tire when viewed as a cross-section from the tire longitudinal direction. Therefore, in an arrangement having circumferential main grooves 2 along the tire equatorial plane CL such as the arrangement illustrated in FIG. 1 and FIG. 2, the distance Gcc is measured omitting the circumferential main grooves 2. The distance Gsh is measured as the length of a vertical line from the tread edge P to the inner circumferential surface of the tire when viewed as a cross-section from the tire longitudinal direction.

In the arrangement illustrated in FIG. 2, the pneumatic tire 1 includes an inner liner 18 on the inner circumferential surface of the carcass layer 13, and the inner liner 18 is disposed across the entire region of the inner circumferential surface of the tire. In such an arrangement, the distance Gcc and the distance Gsh are measured on the basis of the outer surface of the inner liner 18 (inner circumferential surface of the tire).

The tread edge P (1) refers to a point of the tread edge Portion in an arrangement having a square shaped shoulder portion. For example, in the arrangement illustrated in FIG. 2, the tread edge P and a tire ground contact edge T coincide with each other due to the shoulder portion having a square shape. Conversely, (2) in an arrangement in which the shoulder portion has a round shape, as illustrated in the modification example of FIG. 8 to be described later, taking an intersection P' between the tread portion profile and the side wall portion profile when viewed as a cross-section from the tire longitudinal direction, the tread edge P is taken as the bottom of a vertical line drawn from the intersection P' to the shoulder portion.

Additionally, the "tire ground contact edge T" refers to the maximum width position in a tire axial direction of a contact surface between the tire and a flat plate in an arrangement in which the tire is assembled on a specified rim, filled with specified internal pressure, placed perpendicularly to the flat plate in a static state, and loaded with a load corresponding to a specified load.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Figure 4A:
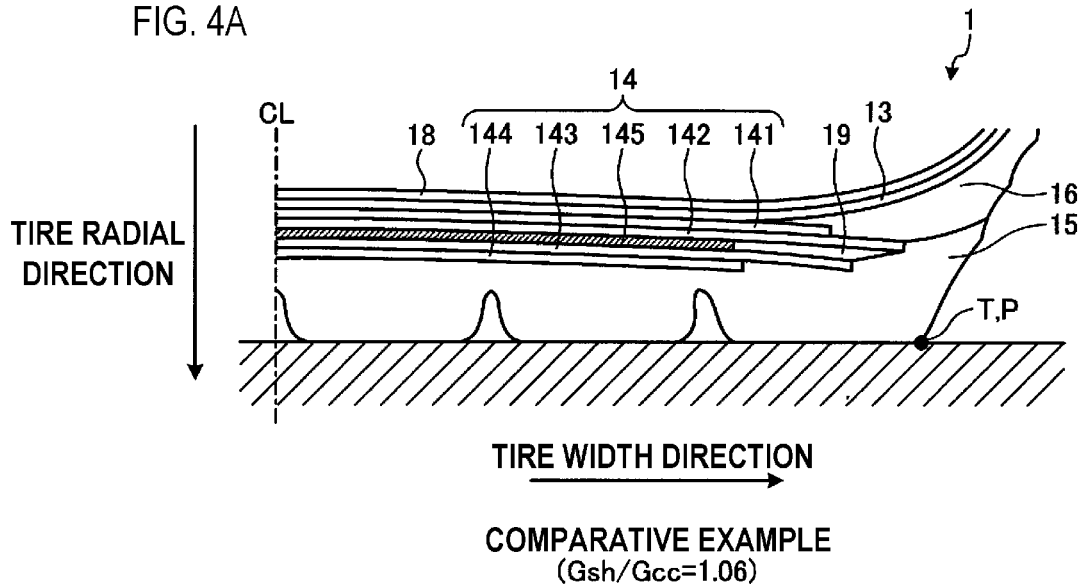
FIG. 4 is an explanatory illustration showing the effect of the pneumatic tire depicted in FIG. 1.
Figure 4B:
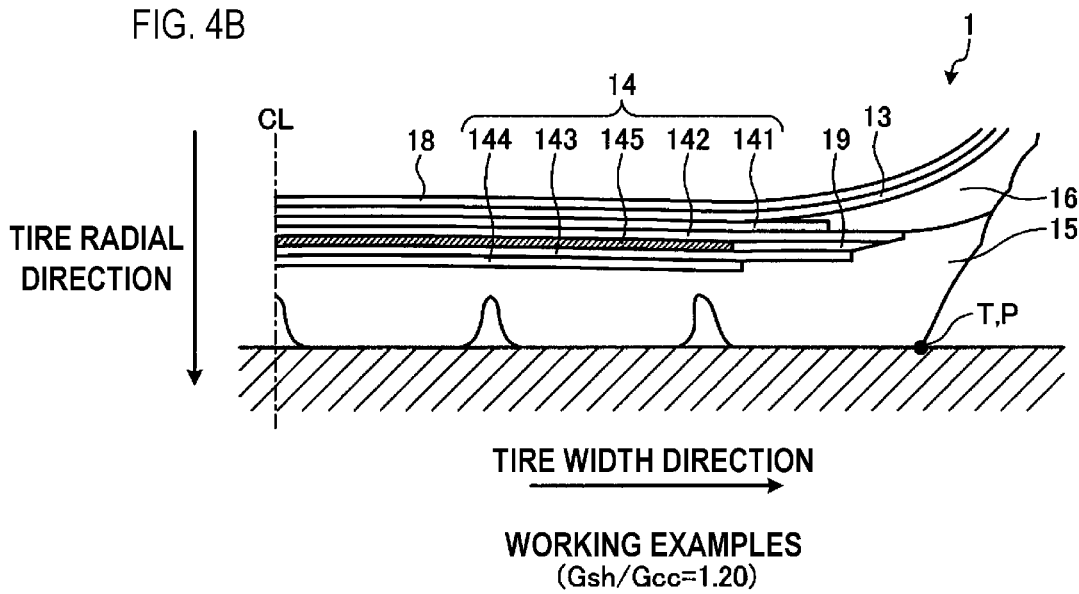
Figure 5:
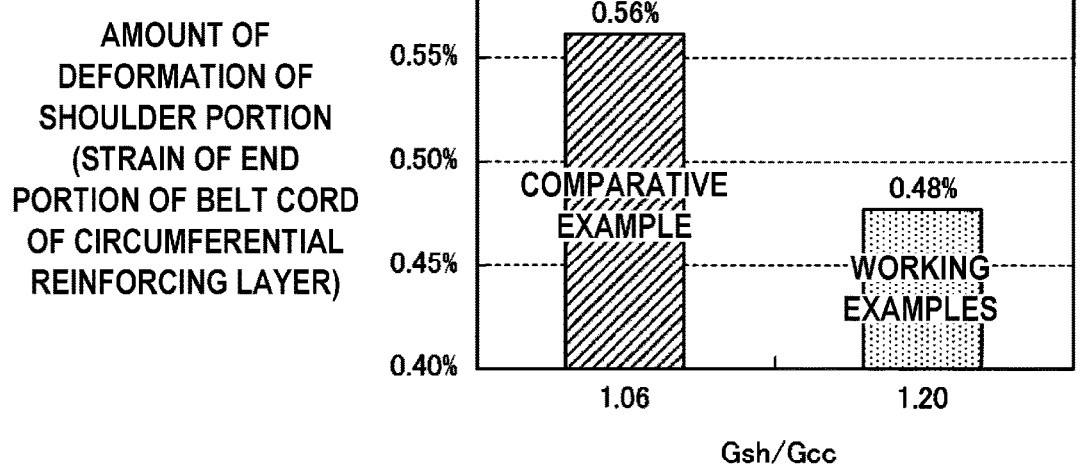
FIG. 5 is an explanatory illustration showing the effect of the pneumatic tire depicted in FIG. 1.

FIGS. 4 and 5 are explanatory views illustrating the operation of the pneumatic tire depicted in FIG. 1. In these diagrams, FIG. 4 illustrates the states of ground contact of tires having mutually different ratios Gsh/Gcc, and FIG. 5 illustrates the amounts of deformation of the shoulder portion at the time of ground contact (strain at end portions of belt cord of circumferential reinforcing layer 145) of each of the tires of FIG. 4.

In the tire of a comparative example of FIG. 4A, in the arrangements of FIGS. 1 to 3, the ratio Gsh/Gcc is set to a small value (Gsh/Gcc=1.06). For this reason, when the tire does not contact the ground, the tread profile has a counterbore shape in which the outside diameter decreases from the tire equatorial plane CL toward the tread edge P (not illustrated). In so doing, when the tire contacts the ground, as depicted in FIG. 4A, the tread rubber on the shoulder portion deforms greatly on the road surface side (outer side in the radial direction of the tire), and each of the belt plies 141 to 145 of the belt layer 14 curves greatly on the road surface side (outer side in the radial direction of the tire) toward the outer side in the widthwise direction of the tire. This reduces the envelopment of the tread portion, which tends to reduce ride comfort performance.

In contrast, in the tire of a comparative example of FIG. 4B, in the arrangements of FIGS. 1 to 3, the ratio Gsh/Gcc is set to a large value (Gsh/Gcc=1.20). For this reason, when the tire does not contact the ground, the difference in diameter between the outside diameter of the tread profile at the tire equatorial plane CL and the outside diameter at the tread edge P is small, and as a whole, the tread face has a flat (substantially parallel to the tire rotational axis) shape (see FIGS. 1 and 2). Furthermore, the volume (distance Gsh) of the tread rubber 15 at the shoulder portion is ensured, and rigidity of the shoulder land portion 3 is ensured. As a result, the envelopment of the tread portion is ensured, and the ride comfort performance of the tire is increased.

In FIG. 2, point Q1 is an intersection between a vertical line drawn from the tread end P to the inner circumferential surface of the tire and the wider cross belt 142 of the pair of cross belts 142, 143. Q2 is a base of a vertical line drawn from an outer end of the circumferential reinforcing layer 145 with respect to the widthwise direction of the tire to the wider cross belt 142. Point Q1 and point Q2 are defined as points on an arc connecting the outer radial direction of the tire apexes of the belt cord wider cross belt 142 as seen in a cross-sectional view in the longitudinal direction of the tire.

The distance Gs from point Q1 to the tread profile and the distance Ge from point Q2 to the tread profile have a relationship such that 1.00≤Gs/Ge. This ensures suitable volume (distance Gs) for the tread rubber 15 at the shoulder portion, and suitable rigidity for the shoulder land portions 3.

There is no particular limit upon the maximum value for the ratio Gs/Ge, but Gs/Ge is preferably equal to or less than 1.30. A ratio Gs/Ge exceeding 1.30 is not preferable, as the volume (distance Gs) of the tread rubber 15 will be too thick, reducing the durability of the tire.

In the configuration shown, for example, in FIG. 2, the pair of cross belts 142, 143 are disposed so as to sandwich the circumferential reinforcing layer 145 therebetween, with the cross belt 142, which is located further inward with respect to the radial direction of the tire, having a wider structure than the other cross belt 143, as illustrated in FIG. 3. The distance Gs and distance Ge are defined on the basis of the cross belt 142 located on the inner side in the radial direction of the tire.

However, the present technology is not limited to such an arrangement; that cross belt out of the pair of cross belts 142, 143 that is located further outward with respect to the radial direction of the tire may have a wider structure (not illustrated). In such a case, the distance Gs and distance Ge are defined on the basis of the cross belt located on the outer side in the radial direction of the tire.

Additionally, in FIG. 1, the tread width TW and the width Ws of the circumferential reinforcing layer 145 preferably have a relationship such that $0.70 \leq Ws/TW \leq 0.90$.

The tread width TW is the distance in the direction of the tire rotational axis between the left and right tread ends P, P, measured when the tire is assembled on a standard rim, inflated to a prescribed internal pressure and is in an unloaded state.

The width Ws of the circumferential reinforcing layer 145 is the distance measured between the left and right end portions of the circumferential reinforcing layer 145 in the tire rotation direction when the tire is assembled on a specified rim, is inflated to a specified internal pressure, and is in an unloaded state. The width Ws of the circumferential reinforcing layer 145 is the distance between the outermost end portions of the divided portions when the circumferential reinforcing layer 145 has a structure that is divided in the widthwise direction of the tire (not illustrated in the drawings).

Moreover, in a typical pneumatic tire, it has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

By contrast, in a pneumatic tire having a left-right asymmetrical structure (not illustrated), the range of the ratio Ws/TW of the width Ws of the circumferential reinforcing layer 145 and the tread width TW is defined by conversion to half width based on the tire equatorial plane CL. Specifically, a distance TW' (not shown) from the tire equatorial plane CL to the tread edge P and a distance Ws' from the tire equatorial plane CL to an end portion of the circumferential reinforcing layer 145 are set to a relationship such that $0.70 \leq Ws'/TW' \leq 0.90$.

Figure 6:
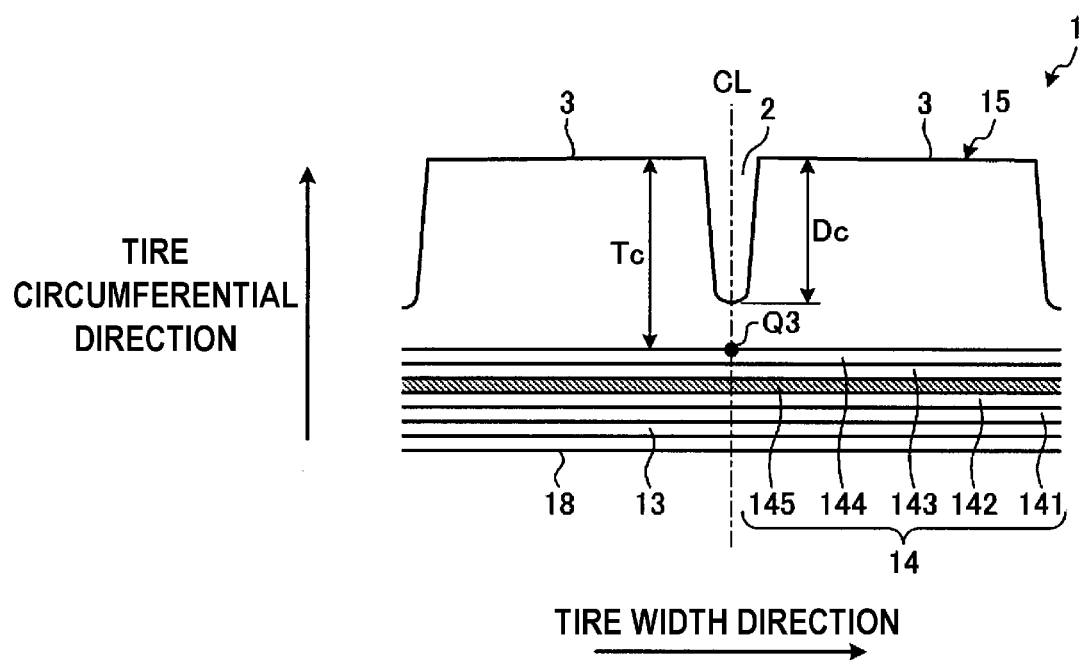
FIG. 6 is a magnified view illustrating the main parts of the pneumatic tire depicted in FIG. 1.
Figure 7:
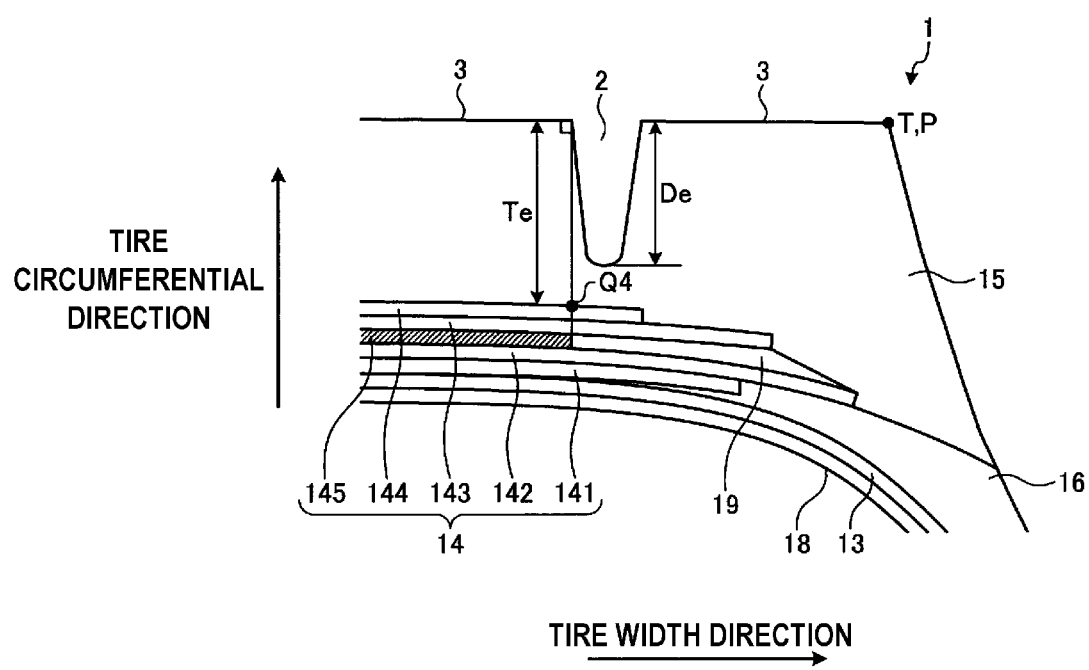
FIG. 7 is a magnified view illustrating the main parts of the pneumatic tire depicted in FIG. 1.

FIGS. 6 and 7 are magnified views illustrating the main parts of the pneumatic tire depicted in FIG. 1. These drawings illustrate the relationship between the circumferential main grooves 2 and the tread gauge at various positions.

As shown in FIG. 6, point Q3 is an intersection between a groove centerline of the circumferential main groove 2 nearest the tire equatorial plane CL and that belt ply out of the steel cord belt plies constituting the belt layer 14 that is located furthest outward in the radial direction of the tire as seen in a longitudinal cross-sectional view of the tire.

If a circumferential main groove 2 is present on the tire equatorial plane CL, "circumferential main groove 2 nearest the tire equatorial plane CL" refers to this circumferential main groove 2 (see FIGS. 1 and 6); if a land portion 3 is present on the tire equatorial plane CL (i.e., a circumferential main groove 2 is not present), the term refers to that circumferential main groove 2, out of the plurality of circumferential main grooves 2, that is positioned nearest the tire equatorial plane CL.

As illustrated in FIG. 6, point Q3 is defined in terms of the distance between the tread profile (imaginary line in FIG. 6) and an arc connecting the apexes of the belt cords of the belt plies to the outside with respect to the radial direction of the tire as seen in a longitudinal cross-sectional view of the tire. Because the belt plies are made of steel cords, belt plies made of belt cords of organic fibers are omitted when defining point Q3. For example, in the arrangement in FIGS. 1 and 6, all of the belt plies 141 to 145 constituting the belt layer 14 are made of steel cords, and point Q3 is defined on the basis of the belt cover 144 on the outermost layer.

The groove depth Dc of the circumferential main groove 2 nearest the tire equatorial plane CL and the distance Tc from point Q3 to the tread profile (the imaginary line illustrated in FIG. 6) have a relationship such that $1.30 \leq Tc/Dc \leq 1.55$. The ratio Tc/Dc is preferably within the range of $1.35 \leq Tc/Dc \leq 1.55$. This creates a suitable relationship between groove depth Dc in the central region of the tread portion and tread gauge (distance Tc).

The groove depth Dc is measured as the distance between the tread profile and the groove bottom. Stone ejectors formed on the floor of the groove and other parts above the floor of the groove are omitted when measuring the groove depth Dc.

As shown in FIG. 7, point Q4 is an intersection between a vertical line drawn from an end of the circumferential reinforcing layer 145 to the tread profile and that belt ply out of the steel cord belt plies making up the belt layer 14 that is located furthest outward in the radial direction of the tire (in FIG. 7, belt cover 144) as seen in a longitudinal cross-sectional view of the tire.

The groove depth De of the circumferential main groove 2 on the outer side in the widthwise direction of the tire and the distance Te from point Q4 to the tread profile have a relationship such that $1.35 \leq Te/De \leq 1.60$. As a result, a relationship between the groove depth De in the vicinity of the end portion of the circumferential reinforcing layer 145 and tread gauge (distance Te) is made appropriate.

The groove depth De is measured as the distance between the tread profile and the floor of the groove. Stone ejectors formed on the floor of the groove and other parts above the floor of the groove are omitted when measuring the groove depth De.

In FIG. 1, the width Wb2 of the wider cross belt 142 and the width Wca of the carcass layer 13 have a relationship such that $0.74 \leq Wb2/Wca \leq 0.89$. The ratio Wb2/Wca is preferably within the range of $0.78 \leq Wb2/Wca \leq 0.83$.

The cross-sectional width Wca of the carcass layer 13 is the linear distance at the position of maximum left-right width on the carcass layer 13 as measured when the tire is mounted on a standard rim, inflated to a standard internal pressure, and no load is applied.

Furthermore, in the pneumatic tire 1, the width Wb1 of the large angle belt 141 and the width Wb3 of the narrower cross belt 143 of the pair of cross belts 142, 143 preferably have a relationship such that $0.85 \leq Wb1/Wb3 \leq 1.05$ (see FIG. 3). As a result, the ratio Wb1/Wb3 is made appropriate.

The width Wb1 of the large angle belt 141 and the width Wb3 of the cross belt 143 are measured as the distance in the widthwise direction of the tire when the tire is assembled on a regular rim, inflated to a regular internal pressure, and no load is applied.

In the arrangement in FIG. 1, the belt layer 14 has a structure with left-right symmetry around the tire equatorial plane CL as illustrated in FIG. 3, and the width Wb1 of the large angle belt 141 and the width Wb3 of the narrower cross belt 143 have a relationship such that Wb1<Wb3. As a result, an edge portion of the large angle belt 141 is disposed on an inner side in the widthwise direction of the tire of the edge portion of the narrower cross belt 143 in a region on either side of the tire equatorial plane CL. However, the arrangement is not limited thereto, and the width Wb1 of the large angle belt 141 and the width Wb3 of the narrower cross belt 143 may have a relationship such that Wb1≥Wb3 (not illustrated in the drawings).

Moreover, the belt cords of the large angle belt 141 are preferably steel wire, and the large angle belt 141 preferably has at least 15 ends per 50 mm and not more than 25 ends per 50 mm (see FIG. 4). Moreover, the belt cords of the pair of cross belts 142, 143 are preferably steel wire, and the pair of cross belts 142, 143 preferably have at least 18 ends per 50 mm and not more than 28 ends per 50 mm. Also, the belt cords that constitute the circumferential reinforcing layer 145 are steel wire, and the circumferential reinforcing layer 145 preferably has at least 17 ends per 50 mm and not more than 30 ends per 50 mm. As a result, the strengths of the belt plies 141, 142, 143, 145 are properly ensured.

Moreover, a modulus E1 at 100% elongation of the coating rubber of the large angle belt 141 and a modulus Es at 100% elongation of the coating rubber of the circumferential reinforcing layer 145 preferably have a relationship such that 0.90≤Es/E1≤1.10 (see FIG. 4). Moreover, moduli E2, E3 at 100% elongation of the coating rubbers of the pair of cross belts 142, 143, and the modulus Es at 100% elongation of the coating rubber of the circumferential reinforcing layer 145 preferably have a relationship such that 0.90≤Es/E2≤1.10 and 0.90≤Es/E3≤1.10. Moreover, the modulus Es at 100% elongation of the coating rubber of the circumferential reinforcing layer 145 preferably is in a range of 4.5 MPa≤Es≤7.5 MPa. As a result, the moduli of the belt plies 141, 142, 143, 145 are made appropriate.

The modulus at 100% elongation is measured in a tensile test at ambient temperature in conformance with JIS (Japanese Industrial Standard) K6251 (using dumbbell no. 3).

Moreover, a breaking elongation λ1 of the coating rubber of the large angle belt 141 is preferably equal to or greater than 200% (see FIG. 4). Moreover, breaking elongations λ2, λ3 of the coating rubbers of the pair of cross belts 142, 143 are both preferably equal to or greater than 200%. Furthermore, a breaking elongation λs of the coating rubber of the circumferential reinforcing layer 145 is preferably equal to or greater than 200%. As a result, the durability of the belt plies 141 142, 143, 145 is properly ensured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Elongation is preferably at least 1.0% and not more than 2.5% when the tensile load of the belt cords as components that configure the circumferential reinforcing layer 145 is from 100 N to 300 N, and is preferably at least 0.5% and not more than 2.0% when the tensile load is from 500 N to 1000 N as cured tire components (when removed from the tire). The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, as illustrated in FIG. 3, the circumferential reinforcing layer 145 is preferably disposed inward with respect to the widthwise direction of the tire from the left and right edge portions of the narrower cross belt 143 of the pair of cross belts 142, 143. The width Wb3 of the narrower cross belt 143 and the distance S from the edge portion of the circumferential reinforcing layer 145 to the edge portion of the narrower cross belt 143 preferably have a relationship such that 0.03≤S/Wb3≤0.12. This ensures that there is suitable distance between the end portions of the width Wb3 of the cross belt 143 and the end portions of the circumferential reinforcing layer 145. This point is the same even if the circumferential reinforcing layer 145 has a divided structure (not illustrated on the drawings).

The distance S of the circumferential reinforcing layer 145 is measured as a distance in the widthwise direction of the tire when the tire is assembled on a standard rim, inflated to a specified internal pressure, and no load is applied.

Further, in the arrangement in FIG. 1, the circumferential reinforcing layer 145 is constituted by a single steel wire wound in a spiral manner, as illustrated in FIG. 3. However, the arrangement is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably no more than 12 mm. As a result, a plurality of wires (no less than 2 and no more than 5 wires) can be wound properly at a slant within a range of ±5° with respect to the circumferential direction of the tire.

Additionally, in the arrangement in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side in the radial direction of the tire of the pair of cross belts 142, 143 (not illustrated on the drawings). Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated on the drawings).

Additionally, in the pneumatic tire 1, the breaking elongation of the tread rubber 15 is preferably at least 350%. This ensures the strength of the tread rubber 15 and suppresses the formation of tears in the outermost circumferential main groove 2. Further, the maximum breaking elongation of the tread rubber 15 is not specifically limited, but is constrained by the type of rubber compound of the tread rubber 15.

Furthermore, in the pneumatic tire 1, the hardness of the tread rubber 15 is preferably within a range of not greater than 70. As a result, the strength of the tread rubber 15 is ensured, and the occurrence of tears in the outermost circumferential main groove 2 is suppressed. Further, the maximum hardness of the tread rubber 15 is not specifically limited, but is constrained by the type of rubber compound of the tread rubber 15.

Here, "rubber hardness" refers to JIS-A hardness in accordance with JIS-K6263.

[Round Shaped Shoulder Portion]

Figure 8:
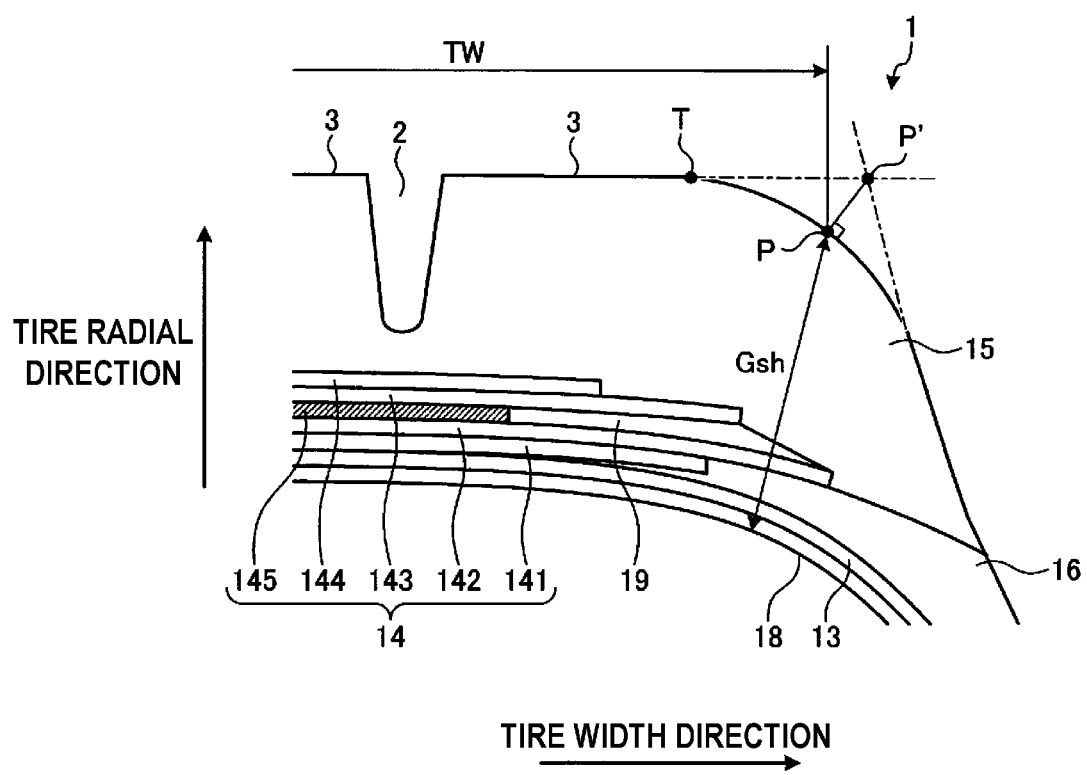
FIG. 8 is an explanatory illustration showing a modified example of the pneumatic tire depicted in FIG. 1.

FIG. 8 is an explanatory view of a modified example of the pneumatic tire depicted in FIG. 1. FIG. 4 illustrates an arrangement having a shoulder portion with a round shape.

In the arrangement in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 8. In such a case, an intersection P' is taken from the tread portion profile and the side wall portion profile when viewed as a cross-section from the tire longitudinal direction, and the tread edge P is taken as the bottom of a vertical line drawn from the intersection P' to the shoulder portion. Therefore, the tire ground contact edge T and the tread edge P normally are in mutually different locations.

[Belt Edge Cushion Two-Color Structure]

Figure 9:
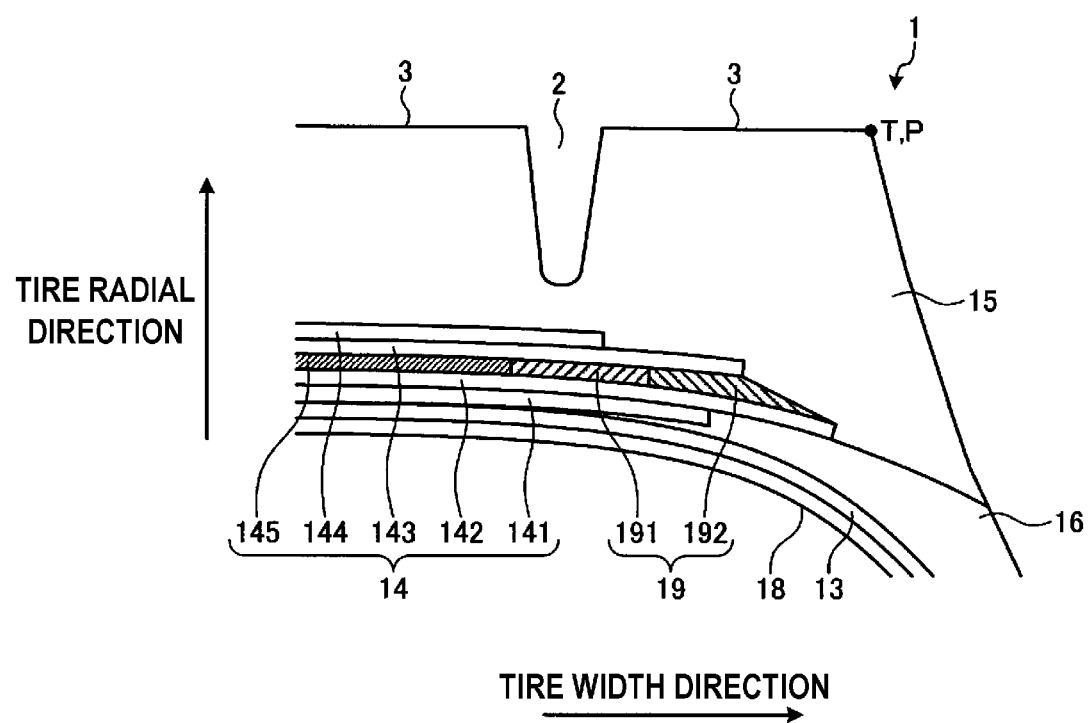
FIG. 9 is an explanatory illustration showing a modified example of the pneumatic tire depicted in FIG. 1.

FIG. 9 is an explanatory view of a modified example of the pneumatic tire depicted in FIG. 1. FIG. 7 is an enlarged view of an end portion of the belt layer 14 on the outer side in the widthwise direction of the tire. The circumferential reinforcing layer 145 and the belt edge cushion 19 in FIG. 6 are indicated by hatching.

In the arrangement illustrated in FIG. 1, the circumferential reinforcing layer 145 is disposed on the inner side in the widthwise direction of the tire of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the widthwise direction of the tire so as to be adjacent to the circumferential reinforcing layer 145, and extends from the end portion on the outer side of the circumferential reinforcing layer 145 in the widthwise direction of the tire to the end portion on the outer side of the pair of cross belts 142, 143 in the widthwise direction of the tire.

In the arrangement illustrated in FIG. 1, the belt edge cushion 19 has a structure that is thicker as a whole than the circumferential reinforcing layer 145 due to the thickness increasing toward the outer side in the widthwise direction of the tire. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, there is an advantage that the occurrence of separation of rubber materials between the pair of cross belts 142, 143 and in a region on the outer side in the widthwise direction of the tire of the circumferential reinforcing layer 145 is suppressed.

By contrast, in the arrangement illustrated in FIG. 9, the belt edge cushion 19 in the arrangement illustrated in FIG. 1 has a two-colored structure composed of stress relief rubber 191 and end portion relief rubber 192. The stress relief rubber 191 is disposed between the pair of cross belts 142, 143 on the outer side of the circumferential reinforcing layer 145 in the widthwise direction of the tire so as to be adjacent to the circumferential reinforcing layer 145. The end portion relief rubber 192 is disposed between the pair of cross belts 142, 143 on the outer side of the stress relief rubber 191 in the widthwise direction of the tire at a position corresponding to the edge portion of the pair of cross belts 142, 143 so as to be adjacent to the stress relief rubber 191. Therefore, when viewed as a cross-section from the tire longitudinal direction, the belt edge cushion 19 has a structure composed by disposing the stress relief rubber 191 and the end portion relief rubber 192 side to side in the widthwise direction of the tire to fill a region from the end portion of the circumferential reinforcing layer 145 on the outer side in the widthwise direction of the tire to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship such that Ein<Es in the arrangement in FIG. 9. Specifically, the modulus Ein of the stress relief rubber 191 and the modulus Es of the circumferential reinforcing layer 145 preferably have a relationship such that $0.6 \leq Ein/Es \leq 0.9$.

Moreover, in the arrangement illustrated in FIG. 9, a modulus Ein at 100% elongation of the stress relief rubber 191 and the modulus Eco at 100% elongation of the coating rubber of the cross belts 142, 143 have a relationship such that Ein<Eco. Specifically, the modulus Ein of the stress relief rubber 191 and the modulus Eco of the coating rubber preferably have a relationship such that $0.6 \leq Ein/Eco \leq 0.9$.

Additionally a modulus Eout at 100% elongation of the end portion relief rubber 192 and the modulus Ein at 100% elongation of the stress relief rubber 191 preferably have a relationship such that Eout<Ein in the arrangement in FIG. 9. Additionally, the modulus Ein at 100% elongation of the stress relief rubber 191 preferably is within a range of $4.0 \text{ MPa} \leq Ein \leq 5.5 \text{ MPa}$.

Since the stress relief rubber 191 is disposed on the outer side of the circumferential reinforcing layer 145 in the widthwise direction of the tire in the arrangement illustrated in FIG. 9, shearing strain of the peripheral rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, separation of the periphery rubber of the circumferential reinforcing layer 145 is suppressed.

Effect

As described above, the pneumatic tire 1 includes a carcass layer 13, a belt layer 14 disposed on the outer side of the carcass layer 13 in the radial direction of the tire, and a tread rubber 15 disposed on the outer side of the belt layer 14 in the radial direction of the tire (see FIG. 1). Moreover, the belt layer 14 is formed by layering the pair of cross belts 142, 143 having a belt angle with an absolute value from 10° to 45° inclusive and mutually opposite signs, and the circumferential reinforcing layer 145 having a belt angle within a range of ±5° with respect to the circumferential direction of the tire (see FIG. 3). Moreover, the distance Gcc from the tread profile to the inner circumferential surface of the tire along the tire equatorial plane CL and the distance Gsh from the tread edge P to the inner circumferential surface of the tire have a relationship such that $1.10 \leq Gsh/Gcc$ (see FIG. 2). The distance Gs from point Q1 to the tread profile and the distance Ge from point Q2 to the tread profile have a relationship such that $1.00 \leq Gs/Ge$.

In such an arrangement, (1) because the ratio Gsh/Gcc is set to a high value, the tread face as a whole has a flat (substantially parallel to the tire rotational axis) shape, and the volume of tread rubber 15 (distance Gsh) at the shoulder portion is ensured (see FIGS. 1 and 2). In addition, (2) because the ratio Gs/Ge is set to a high value, the volume (distance Gs) of the tread rubber 15 at the shoulder portion is appropriately ensured. As a result, the deformation level of the shoulder portion when the tire is in contact with the ground is reduced, and suitable rigidity is ensured for the shoulder land portions. This ensures suitable envelopment and offers the advantage of improved tire ride comfort performance.

Moreover, (3) by virtue of the above arrangements (1) and (2), the amount of deformation of the shoulder portion when the tire contacts the ground is reduced, and strain on the belt plies 141 to 145 is reduced (see FIG. 5). As a result, there are the advantages that the occurrence of separation of the peripheral rubber of the end portions of the belt plies 141 to 145 is suppressed, and the occurrence of separation of the coating rubber between adjacent belt plies 141 to 145 is suppressed.

The tread width TW and the width Ws of the circumferential reinforcing layer 145 of the pneumatic tire 1 have a relationship such that $0.70 \leq Ws/TW \leq 0.90$ (see FIG. 1). Such an arrangement yields a suitable ratio Ws/TW of the width Ws of the circumferential reinforcing layer 145 to the tread width TW, thereby effectively reducing the deformation level of the shoulder portions when the tire is in contact with the ground (see FIGS. 4(b) and 5). This offers the advantage of effectively improving tire ride comfort performance. Specifically, having the ratio Ws/TW be equal to or greater than 0.70 ensures a suitable width Ws for the circumferential reinforcing layer 145, reducing the deformation level of the shoulder portions when the tire contacts the ground. Having the ratio Ws/TW be equal to or less than 0.90 suppresses deformation of the ends of the belt plies when the tire is in contact with the ground, thereby reducing warping of the ends of the belt plies.

In the pneumatic tire 1, the groove depth Dc of the circumferential main groove 2 nearest the tire equatorial plane CL and the distance Tc from a predetermined point Q3 to the tread profile have a relationship such that $1.30 \leq Tc/Dc \leq 1.55$ (see FIG. 6). This offers the advantage of creating a suitable relationship between groove depth Dc in the central region of the tread portion and tread gauge (distance Tc). Specifically, having the ratio Tc/DC be equal to or greater than 1.30 ensures a suitable tread gauge (distance Tc) for the central area of the tread portion, and suppresses the formation of groove cracks in the circumferential main grooves 2. Having the ratio Tc/Dc be equal to or less than 1.55 yields suitable improvement in ride comfort performance, and allows increases in tire weight due to excessive tread gauge to be suppressed. In the present pneumatic tire 1, the groove depth De of the circumferential main groove 2 located furthest outward in the widthwise direction of the tire and the distance Te from point Q4 to the tread profile have a relationship such that $1.35 \leq Te/De \leq 1.60$ (FIG. 7). This offers the advantage of creating a suitable relationship between groove depth De at the end of the circumferential reinforcing layer 145 and tread gauge (distance Te). Specifically, having the ratio Te/De being equal to or greater than 1.35 ensures a tread gauge (distance Te) at the ends of the circumferential reinforcing layer 145, and suppresses the formation of groove cracks in the circumferential main grooves 2. Having the ratio Te/De be equal to or less than 1.60 yields suitable improvement in ride comfort performance, and allows increases in tire weight due to excessive tread gauge to be suppressed.

In the present pneumatic tire 1, the width Wb2 of the wider cross belt 142 and the width Wca of the carcass layer 13 have a relationship such that $0.74 \leq Wb2/Wca \leq 0.89$ (see FIG. 1). This offers the advantage of yielding a suitable width Wb2 for the wider cross belt.

In the present pneumatic tire 1, the belt cords of the cross belts 142, 143 are steel wires, and have at least 18 ends per 50 mm and no more than 28 ends per 50 mm. This offers the advantage of yielding a suitable number of ends for the belt cords of the cross belts 142, 143. Specifically, having there be at least 18 ends per 50 mm ensures suitable strength for the cross belts 142, 143. Having there be no more than 28 ends per 50 mm ensures a suitable amount of coating rubber for the cross belts 142, 143, and suppresses the separation of rubber materials between adjacent belt plies.

Furthermore, in the present pneumatic tire 1, the belt layer 14 includes the large angle belt 141 having a belt angle with an absolute value from 45° to 70° inclusive (see FIGS. 1 and 3). As a result, there is the advantage that the belt layer 14 is reinforced and strain of the end portions of the belt layer 14 when the tire contacts the ground is suppressed.

In the pneumatic tire 1, the belt cords of the large angle belt 141 are steel wires, and have format least 15 ends per 50 mm and no more than 25 ends per 50 mm. As a result, there is an advantage that the number of ends for the belt cord of the large angle belt 141 is made appropriate. Specifically, due to the fact that the large angle belt 141 has at least 15 ends per 50 mm, the strength of the large angle belt 141 is appropriately ensured. Due to the fact that the large angle belt 141 has not more than 25 ends per 50 mm, the amount of coating rubber of the large angle belt 141 is appropriately ensured, and the separation of rubber material between the adjacent belt plies (in FIG. 2, the cross belts 142) is suppressed.

Furthermore, in the pneumatic tire 1, the width Wb1 of the large angle belt 141 and the width Wb3 of the narrower cross belt 143 of the pair of cross belts 142, 143 have a relationship such that $0.85 \leq Wb1/Wb3 \leq 1.05$ (see FIG. 3). With such an arrangement, the ratio Wb1/Wb3 between the width Wb1 of the large angle belt 141 and the width Wb3 of the narrower cross belt 143 is made appropriate. As a result, there is the advantage that the strain of the end portions of the belt layer 14 when the tire contacts the ground is suppressed.

In the pneumatic tire 1, the hardness of the tread rubber 15 is within a range of 70 or less. As a result, there is an advantage the occurrence of tears in the outermost circumferential main groove 2 is suppressed due to the fact that the strength of the tread rubber 15 is ensured.

Also, in the pneumatic tire 1, the belt cords that constitute the circumferential reinforcing layer 145 are steel wires, and the circumferential reinforcing layer 145 has at least 17 ends per 50 mm and not more than 30 ends per 50 mm. As a result, there is the advantage that the number of ends of the belt cords of the circumferential reinforcing layer 145 is made appropriate. Specifically, the strength of the circumferential direction reinforcing layer 145 is properly ensured due to the circumferential reinforcing layer 145 having at least 17 ends per 50 mm. Moreover, the amount of rubber of the coating rubber of the circumferential reinforcing layer 145 is properly ensured and separation of the rubber materials between the contiguous belt plies (the pair of cross belts 142, 143 and the circumferential reinforcing layer 145 in FIG. 3) is suppressed due to the circumferential reinforcing layer 145 having not more than 30 ends per 50 mm.

In the pneumatic tire 1, the elongation of the belt cords from which the circumferential reinforcing layer 145 is configured when they are components when subjected to a tensile load of 100 N to 300 N is preferably at least 1.0% and not more than 2.5%. As a result, there is an advantage that the effect of suppressing radial growth in the center region is properly ensured due to the circumferential reinforcing layer 145.

In the pneumatic tire 1, elongation is at least 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly ensured due to the circumferential reinforcing layer 145.

In the pneumatic tire 1, the circumferential reinforcing layer 145 is disposed on the inner side in the widthwise direction of the tire of the left and right edges of the narrower cross belt 143 of the pair of cross belts 142, 143 (see FIG. 3). The pneumatic tire 1 is provided with the stress relief rubber 191 disposed between the pair of cross belts 142, 143 and on the outer side of the circumferential reinforcing layer 145 in the widthwise direction of the tire so as to be adjacent to the circumferential reinforcing layer 145, and the end portion relief rubber 192 disposed between the pair of cross belts 142, 143 and on the outer side of the stress relief rubber 191 in the widthwise direction of the tire and at a position corresponding to the edge portions of the pair of cross belts 142, 143 so as to be adjacent to the stress relief rubber 191 (see FIG. 9).

In such an arrangement, there is an advantage that fatigue rupture of the periphery rubber at the edge portion of the circumferential reinforcing layer 145 is suppressed due to the circumferential reinforcing layer 145 being disposed on the inner side in the widthwise direction of the tire from the left and right edge portions of the narrower cross belt 143 of the pair of cross belts 142, 143. Since the stress relief rubber 191 is disposed on the outer side of the circumferential reinforcing layer 145 in the widthwise direction of the tire, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, there is an advantage that separation of the periphery rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that Ein<Eco. As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that 0.6≤Ein/Eco≤0.9. As a result, there is the advantage that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of 4.0 MPa≤Ein≤5.5 MPa (see FIG. 9). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

In the present pneumatic tire 1, the circumferential reinforcing layer 145 is disposed inward with respect to the widthwise direction of the tire of the left and right edges of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 have a relationship such that 0.03≤S/Wb3≤0.12. This has the advantage of providing an appropriate positional relationship S/Wb3 between the edge portions of the cross belts 142, 143 and the edge portions of the circumferential reinforcing layer 145. Specifically, the relationship 0.03≤S/Wb3 ensures an appropriate distance between the end portions of the circumferential reinforcing layer 145 and the end portions of the cross belt 143 to suppress the separation of the periphery rubbers at the end portions of these belt plies 145, 143. Additionally, the relationship S/Wb3≤0.12 ensures the width Ws of the circumferential reinforcing layer 145 relative to the width Wb3 of the cross belt 143, thereby ensuring suitable anchoring effects on the part of the circumferential reinforcing layer 145.

Target of Application

The present pneumatic tire 1 is preferably applied to a tire for heavy loads having an aspect ratio from 40% to 70% inclusive when mounted on a standard rim, inflated to a standard internal pressure, and subjected to a standard load. Tires for heavy loads are subjected to heavier loads when used than are tires for passenger vehicles. Thus, there is a tendency for there to be a large difference in diameter between the area of the tread surface where the circumferential reinforcing layer 145 is disposed and the area outside the circumferential reinforcing layer 145 with respect to the widthwise direction of the tire. In addition, tires having a low aspect ratio as described above tend to take on a drum-like shape when in contact with the ground. Thus, dramatic improvement in the ride comfort performance of the tire described above can be obtained by applying the present technology to a tire for heavy loads of this sort.

EXAMPLES

FIGS. 10A-10B and 11A-11B are tables showing the results of performance testing of pneumatic tires according to the embodiment of the present technology.

In the performance testing, a plurality of different pneumatic tires was evaluated for (1) durability and (2) ride comfort performance (see FIGS. 10A-10B and 11A-11B). In this evaluation, pneumatic tires having a tire size of 315/60 R22.5 were mounted on a TRA specification standard rim (rim size 22.5×9.00) and inflated with a TRA specification maximum air pressure of 900 kPa).

(1) In the evaluation for durability, a low-pressure durability test using an indoor drum tester was performed. Traveling speed was set to 45 km/h, with an initial load of 34.81 kN being increased by 5% (1.74 kN) every 12 hours, and the distance traveled when the tire failed was measured. Evaluations were made on the basis of the measurement results using a conventional example (100) as a reference. In these evaluations, higher scores were preferable.

(2) In the ride comfort performance evaluation, a pneumatic tire was mounted to a steering shaft of a 6×5 tractor trailer test vehicle, and five test drivers drove the test vehicle on a predetermined test course and made sensory evaluations. Evaluations were made on the basis of the evaluations using a conventional example (100) as a standard. In these evaluations, higher scores were preferable. Specifically, an evaluation of 110 or greater indicates dramatic superiority over the conventional example.

The pneumatic tires of Working Examples 1 to 31 had the arrangement illustrated in FIGS. 1 to 3. The primary dimensions were set to TW=275 mm, Wca=320 mm, Gcc=32.8 mm, Dc=19.8 mm, and Tc=26.1 mm.

The pneumatic tire of the conventional example had different value ranges from the pneumatic tire 1 of working example 1 in the arrangement in FIGS. 1 to 3.

As shown by the test results, it is apparent that the pneumatic tires 1 of working examples 1 to 31 allow for improved tire ride comfort performance while maintaining tire durability. In particular, a comparison of working examples 1 to 16 shows that values of 1.20≤Gsh/Gcc, 1.00≤Gs/Ge, 0.70≤Ws/TW≤0.90, 1.30≤Tc/Dc≤1.55, and 1.35≤Te/De≤1.60 yield dramatically superior ride comfort performance effects (evaluation score of 110 or higher) while maintaining tire durability.

The invention claimed is:

1. A pneumatic tire comprising: a carcass layer; a belt layer disposed on an outer side in a radial direction of the tire of the carcass layer; a tread rubber disposed on an outer side in the radial direction of the tire of the belt layer; at least three circumferential main grooves extending in a circumferential direction of the tire; and a plurality of land portions defined by the circumferential main grooves;

the belt layer being formed by layering a pair of cross belts having belt angles with absolute values of 10° to 45° inclusive and opposite signs, and a circumferential reinforcing layer having a belt angle within a range of ±5° with respect to the circumferential direction of the tire, the circumferential reinforcing layer being configured by belt cords formed from steel;

a distance Gcc from a tread profile to an inner circumferential surface of the tire along a tire equatorial plane and a distance Gsh from a tread edge to an inner circumferential surface of the tire having a relationship such that 1.25≤Gsh/Gcc;

defining an intersection between a vertical line drawn from the tread edge to the inner circumferential surface of the tire and a wider cross belt of the pair of cross belts as point Q1 and a base of a vertical line drawn from an outer end of the circumferential reinforcing layer with respect to a widthwise direction of the tire to the wider cross belt as point Q2, a distance Gs from point Q1 to the tread profile and a distance Ge from point Q2 to the tread profile having a relationship such that 1.00≤Gs/Ge;

defining point Q3 as an intersection between a groove centerline of a circumferential main groove nearest the tire equatorial plane and a belt ply out of steel cord belt plies constituting the belt layer that is located furthest outward in the radial direction of the tire as seen in a longitudinal cross-sectional view of the tire, a groove depth Dc of the circumferential main groove nearest the tire equatorial plane and a distance Tc from the point Q3 to the tread profile have a relationship such that 1.30≤Tc/Dc≤1.55; and defining point Q4 as an intersection between a vertical line drawn from an end portion of the circumferential reinforcing layer to the tread profile and a belt ply out of belt plies made of steel cord constituting the belt layer on an outermost side in the radial direction of the tire when viewed as a cross-section from a longitudinal direction of the tire, a groove depth De of the circumferential main groove on an outermost side in the widthwise direction of the tire and a distance Te from point Q4 to the tread profile have a relationship such that 1.35≤Te/De≤1.60;

wherein the pneumatic tire is a heavy duty tire with an aspect ratio of 70% or less.

2. The pneumatic tire according to claim 1, wherein a tread width TW and a width Ws of the circumferential reinforcing layer have a relationship such that 0.70≤Ws/TW≤0.90.

3. The pneumatic tire according to claim 1, wherein a width Wb2 of the wider cross belt of the pair of cross belts and a width Wca of the carcass layer have a relationship such that 0.74≤Wb2/Wca≤0.89.

4. The pneumatic tire according to claim 1, wherein belt cords of the cross belts are steel wires, and have at least 18 ends per 50 mm and no more than 28 ends per 50 mm.

5. The pneumatic tire according to claim 1, wherein the belt layer has a large angle belt having a belt angle with an absolute value of 45° to 70° inclusive.

6. The pneumatic tire according to claim 5, wherein belt cords of the large angle belt are steel wires, and have at least 15 ends per 50 mm and no more than 25 ends per 50 mm.

7. The pneumatic tire according to claim 5, wherein a width Wb1 of the large angle belt and a width Wb3 of a narrower cross belt of the pair of cross belts have a relationship such that 0.85≤Wb1/Wb3≤1.05.

8. The pneumatic tire according to claim 1, wherein the tread rubber has a hardness of 70 or less.

9. The pneumatic tire according to claim 1, wherein belt cords of the circumferential reinforcing layer are steel wires, and have at least 17 ends per 50 mm and not more than 30 ends per 50 mm.

10. The pneumatic tire according to claim 1, wherein elongation is from 1.0% to 2.5% inclusive when a tensile load of belt cords as components that configure the circumferential reinforcing layer is from 100 N to 300 N.

11. The pneumatic tire according to claim 1, wherein elongation is from 0.5% to 2.0% inclusive when a tensile load of belt cords as cured tire components that constitute the circumferential reinforcing layer is from 500 N to 1000 N.

12. The pneumatic tire according to claim 1, wherein the circumferential reinforcing layer is disposed further inward with respect to a tire widthwise direction than right and left edge portions of the narrower of the pair of cross belts, and the tire is provided with:

stress relief rubber disposed between the pair of cross belts and disposed to the outer side of the circumferential reinforcing layer with respect to the widthwise direction of the tire so as to be adjacent to the circumferential reinforcing layer; and end portion relief rubber disposed between the pair of cross belts and disposed to the outer side of the stress relief rubber with respect to the widthwise direction of the tire at a position corresponding to edge portions of the pair of cross belts so as to be adjacent to the stress relief rubber.

13. The pneumatic tire according to claim 12, wherein a modulus Ein at 100% elongation of the stress relief rubber and a modulus Eco at 100% elongation of coating rubber of the pair of cross belts have a relationship such that Ein<Eco.

14. The pneumatic tire according to claim 12, wherein the modulus Ein at 100% elongation of the stress relief rubber and the modulus Eco at 100% elongation of coating rubber of the pair of cross belts have a relationship such that $0.6 \leq Ein/Eco \leq 0.9$.

15. The pneumatic tire according to claim 12, wherein the modulus Ein at 100% elongation of the stress relief rubber is in a range of 4.0 MPa $\leq Ein \leq$ 5.5 MPa.

16. The pneumatic tire according to claim 1, wherein the circumferential reinforcing layer is disposed further inward with respect to a tire widthwise direction than right and left edge portions of a narrower cross belt of the pair of cross belts; and a width Wb3 of the narrower cross belt and a distance S from an edge portion of the circumferential reinforcing layer to an edge portion of the narrower cross belt are in a range of $0.03 \leq S/Wb3$.

17. The pneumatic tire according to claim 1, wherein $1.50 \leq Te/De \leq 1.60$.

18. The pneumatic tire according to claim 1, wherein a difference between the relationships Te/De and Tc/Dc is 0.05 or more.

19. The pneumatic tire according to claim 1, wherein $1.45 \leq Tc/Dc \leq 1.55$ and $1.50 \leq Te/De \leq 1.60$.

20. The pneumatic tire according to claim 1, wherein a tread width TW and a width Ws of the circumferential reinforcing layer have a relationship such that $0.70 \leq Ws/TW \leq 0.90$, and the outer end of the circumferential reinforcing layer is located inside the circumferential main groove on the outermost side in the widthwise direction of the tire.

* * * * *